3,395,126
PROCESS FOR THE PRODUCTION OF N-SUL-
PHONYL THIAZOLIDINE-COPOLYMERS OF
FORMALDEHYDE
Wolfgang von der Emden and Ernst-Ulrich Köcher, Le-
verkusen, Germany, assignors to Farbenfabriken Bayer
Aktiengesellschaft, Leverkusen, Germany, a corpora-
tion of Germany
No Drawing. Filed Aug. 23, 1965, Ser. No. 481,972
Claims priority, application Germany, Oct. 30, 1964,
F 44,347
9 Claims. (Cl. 260—67.5)

ABSTRACT OF THE DISCLOSURE

Copolymers based on trioxane and a comonomer of the formula:

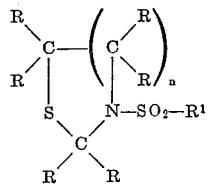

wherein R is hydrogen, lower alkyl or aryl, $R^1$ is alkyl, aryl, aralkyl or alkaryl and $n$ is an integer from 1 to 3 and process of producing the same.

---

The invention relates to new thermostable copolymers of formaldehyde and to a process for the preparation of these copolymers, in which oligomers of formaldehyde, for example trioxane, are polymerised in the presence of cyclic organic nitrogen compounds.

Many methods are known for converting formaldehyde into linear polymers of differing chain lengths. However, these polyoxymethylenes are easily and quantitatively split by thermal treatment into monomeric formaldehyde.

Furthermore, trioxane, the cyclic trimer of formaldehyde, can be polymerised in the presence of cationically active catalysts and more especially Lewis acids to linear polyoxymethylenes, but these polymers are not thermostable. A considerable increase in the thermostability of polyoxymethylenes can be achieved by modifying their terminal groups, i.e. hydroxyl groups as proved in about 1930 by H. Staudinger, in his book: Die hochmolekularen organischen Verbindungen, Berlin 1932, Julius Springer Verlag, page 230 and 231 and in Annalen 474 (1929) page 157. This is done by introducing terminal acetyl groups or methoxy groups in the polymer. The introduction of terminal alkyl groups yields products which, on account of their pure polyacetal structure, also have an excellent resistance to alkali in addition to an improved thermostability.

Such modified polyoxymethylenes still show too low a thermostability for industrial and commercial purposes, since acids and oxygen cause a splitting of the polyoxymethylene chains in the interior thereof, and this in turn results in a total degradation of the molecules concerned this degradation starting from the point where the chain was broken. Two methods have already been indicated for counteracting this thermal instability. The influences of oxygen and acids can be counteracted by introducing additional stabilisers, the effect of which is to prevent degradation. Or copolymers which not only contain oxymethylene (—$CH_2O$—) structural elements, but also to a small degree oxyethylene (—$CH_2$—$CH_2.O$—) structural elements, are prepared from trioxane and as co-monomers cyclic ethers, acetals and lactones. If chain degradation starts in these copolymer, it is stopped at the first oxyethylene group. However, the effect of this procedure is so slight that it is still necessary to use additional stabilisers with these copolymers.

A further advance in improving the thermostability of polyoxymethylenes may be achieved by copolymerising sulphur-containing cyclic comonomers and trioxane, but these comonomers reduce the polymerisation velocity of the monomer mixture, so that the quantity of these co-monomers which can be copolymerised is limited in practice. The object of this invention is a process for preparing copolymers of trioxane having improved thermostability which comprises copolymersing trioxane and cyclic sulphonamides of the general formula

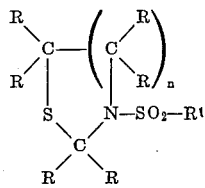

in the presence of cationically active catalysts. In this general formula, each radical R represents a hydrogen atom, a lower alkyl radical, an aryl radical and lower haloalkyl radical, $R^1$ represents an alkyl, preferably a $C_1$ to $C_6$ alkyl, an aryl, aralkyl and an alkaryl radical, which radicals preferably may contain 6 to 20 carbon atoms, and $n$ is an integer from 1 to 3. The radicals R can be the same or different.

These co-monomers act as stabilisers and they introduce structural elements into the polyoxymethylene chain as well, which stop any degradation of the chain. Thus, they combine the action of the stabilisers with the action of the co-monomers hitherto employed. One particular advantage is that these stabilisers are bonded chemically in the polymer and cannot separate from it again. This occurs with stabilisers which are not bonded chemically. The new co-monomers, also have an additional oxidation-inhibiting action and considerably reduce the acid sensitivity of the polymers, due to their nitrogen content.

The ring system of the instant comonomers always contains the grouping

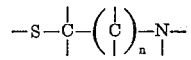

the nitrogen atom being linked by way of a sulphonyl-sulphur atom to the radical $R^1$. The compounds may accordingly be named 1-thia-3-azacycloalkanes with 5 or more ring members and they are on the other hand sulphonamides. 1-thia-3-azacycloalkanes which are suitable for the process of this invention are for example: N-methane sulphony thiazolidine, N-benzenesulphonyl thiazolidine, N-p-toluolsulphonyl thiazolidine, N-methanesulphonyl-5-methyl thiazolidine, N-methanesulphonyl-2-phenyl thiazolidine, N-p-toluolsulphonyl-tetrahydro-1,3-thiazine and N-($C_{12-18}$-alkane sulphonyl)-thiazolidine.

In accordance with the present process, the quantity of these co-monomers to be introduced advantageously is in the range of from 0.5 to 5 mol. percent, based on the trioxane introduced, when the polymer is to have the properties of polyoxymethylenes. Larger quantities of the co-monomer up to 50 mol. percent can be introduced if it is desired to change the properties of the polymer, for example to reduce its melting point and to lower its degree of crystallisation, or to improve its solubility in organic solvents.

The co-monomers of this invention can be produced by known process. Reacting β-mercaptoethylamine or its substituted analogues and also γ-mercaptopropylamine, in acid aqueous solution with an aldehyde or ketone, yields the thiazolidine ring or tetrahydro-1,3-thiazine ring.

Thereafter this ring compound is reacted with a sulphonic acid chloride and the hydrochloric acid formed is neutralised in aqueous solution with an inorganic base or by using for example pyridine as reaction medium. This procedure may be reversed: i.e. optionally substituted mercaptoamine is reacted with the sulphonic acid chloride and the N-mercaptoethyl or N-mercaptopropyl sulphonic acid amide which is obtained is cyclised with the aldehyde or ketone.

The co-monomers used according to the invention slow down the polymerisation velocity, in the same way as other sulphur-containing comonomers of the class comprising thioepoxides, thioethers and thioacetals. Nevertheless, the slowing down of the reaction is less pronounced than for example that caused by thioethers, so that the catalyst concentration only has to be slightly increased compared with the homopolymerisation of trioxane, and molecular weights higher than 30,000 can be obtained without any difficulty using co-monomer quantities up to 5 mol. percent. The lower reaction velocity as compared with the homopolymerisation proves to be advantageous in practice, as the heat of polymerisation is discharged over a larger period of time. This facilitates handling and controling or relatively large batches.

As well as using strong acids such as $H_2SO_4$, $HClO_4$ or alkane-sulphonic acids and p-toluosulphonic acid as cationically active catalysts, it is more especially possible to employ those compounds which are designated as Lewis acids, for example boron trifluoride, boron trichloride, aluminum trichloride, ferric chloride, antimony pentachloride, titanium tetrachloride and tin tetrachloride, as well as the fluorides of the said metals, or even the addition compounds of the boron trihalides, more especially of boron trifluoride with ethers, carboxylic acid esters, carboxylic acid anhydrides, amines, nitriles and monocarboxylic or dicarboxylic acid amides (e.g. diethyl ether, tetrahydrofuran or acetonitrile), and also halogenous organometallic compounds of aluminum and tin and oxonium salts and carboxonium salts, such as triethyl oxonium fluoborate and 2-methyl dioxolenium fluorborate. Fluoborates of aryl-diazonium compounds, which are converted at high temperature into aryl cations with nitrogen being split off, are likewise suitable.

The catalysts are added to the polymerisation medium in quantities of from 0.001 to 1% by weight, based on the weight of the trioxane introduced.

The copolymerisation can be carried out as a block polymerisation, which proceeds within a short time and with a practically quantitative yield. In this mode of operation the catalyst and the trioxane are melted together and the co-monomer is added simultaneously, or the trioxane and the co-monomer are melted and then the catalyst is introduced, optionally in an inert solvent. However, the polymerisation can also be carried out in suspension in an organic liquid, in which trioxane has only limited solubility. Suitable organic liquids for this mode the process are for example straight-chain aliphatic hydrocarbons with more than 8 carbon atoms or mixtures thereof, for example a $C_{12}$–$C_{18}$ fraction with a boiling range of 230 to 320° C.

If the polymerisation is carried out as a solution polymerisation, then the following solvents can for example be used: benzene, toluene, hexane, heptane, cyclohexane, isooctane, white spirit, hydrogenated trimeric isobutylene and chlorinated hydrocarbons.

Generally speaking, the polymerisation according to this invention is carried out at temperatures of from 50 to 120° C. and advantageously at 70 to 110° C. The most preferred range is about 70 to 85° C. Sometimes temperatures which are above or below the indicated temperature range may be used as well.

On heating the copolymers are initially degraded to a certain extent before they reach their maximum stability. This initial degradation reaction can be accelerated by heating the crude polymer in inert solvents, or in alcohols which form semiacetals with the degraded formaldehyde. In order to promote this reaction, it is expedient to introduce organic or inorganic bases which simultaneously destroy the polymerisation catalyst.

Copolymers of different molecular weight ranges can be produced, depending on the intended purpose of use. For use as a thermoplastic material for the manufacture of moulded elements by injection moulding or for the production of fibres by melt-spinning or dry-spinning, copolymers of high molecular weight are suitable, the reduced viscosity of which is in the range from about 0.6 to 3.0, measured at 60° C. in a 0.5% solution of p-chlorophenol. For the preparation of such copolymers, the quantity of organonitrogen compound which is introduced is advantageously 0.5 to 5 mol. percent, based on the trioxane being used. Light stabilisers, dyestuffs, pigments and optionally heat and oxidation stabilisers, fillers or plasticisers can for example be added to these polymers.

If the copolymers are to be used as intermediate products or auxiliary substances in the plastics industry, lower molecular weights down to about 500 may also be desirable. In such a case, also higher proportions of nitrogenous comonomers up to about 50 mol. percent, based on monomeric formaldehyde, can be used. The copolymers obtained can in this case have an oily or resinous consistency at room temperature. The crystallinity of the copolymers increases and the melting point rises with increasing proportion of formaldehyde.

The properties of the copolymers may be still further modified by additional other co-monomers, examples of which are cationically polymerisable olefines or cyclic organic oxygen or sulfur compounds. The following are examples thereof: Styrene, acrylonitrile, ethylvinyl ether, methylvinyl sulphone or epoxy compounds such as ethylene oxide or propylene oxide, cyclic acetals such as 1,3-dioxolane or diethylene glycol formal and triethylene glycol formal, as well as other organic nitrogen co-monomers, such as bis-(alkylsulphonyl)-imidazolidines and alkylsulphonyl oxazolidines.

The copolymers prepared in accordance with this process develop their excellent thermostability only after a short thermal or chemical treatment, in which a small portion is degraded, i.e. the unstable linkages are removed. This can take place by heating the copolymer in substance or in suspension (e.g. in high-boiling hydrocarbons) or in solution (for example in dimethyl formamide, butyrolactone or dimethyl sulphoxide) to temperatures of between 120° C. and more than 200° C. However, the degradation of unstable fractions can also be carried out by the action of aqueous sodium hydroxide solution or of alcohols having up to 6 carbon atoms, e.g. cyclohexanol, in the presence of basic compounds. Suitable basic compounds are alkalihydroxides and organic bases, such as pyridine, tri-n-butylamine, alkanolamines, etc. The degradation to the terminal co-monomer units can also be effected during granulation in an extruder, optionally with addition of organic bases. All these methods of an initial thermal or alkaline treatment result in a degradation of the copolymer chains which stops at the first comonomer unit. The chain ends in the degraded copolymers are thus comonomer units which cannot be split off and cause the desired thermal stability.

The polymers prepared according to the invention are further distinguished from homopolymers the terminal hydroxyl groups of which are esterified or etherified and from copolymers prepared with oxygen-containing co-monomers as they contain oxidation stabilising sulfur as well as the —C—C-grouping forming the terminal groups.

Example 1

N-toluosulphonyl thiazolidine.—37.5 g. of thiazolidine hydrochloride are placed in 47.5 g. of pyridine and 57 g. of p-toluosulphochloride are added while cooling with ice. After 5 hours, the mixture is added to 500 ml. of water. The insoluble deposit is filtered off with suction and recrystallised from acetonitrile.

Yield: 56 g. (78% of the theoretical), melting point 102 to 104° C. Calculated: S, 26.3%. Found: S, 26.2%.

N-toluosulphonyl thiazolidine (second method of preparation).—11.3 g. of mercaptoethylamine hydrochloride are dissolved in 50 ml. of water; 19.0 g. of p-toluosulphochloride are slowly added and simultaneously potassium carbonate solution is introduced dropwise, so that the pH value in the solution remains between 5 and 8. 20 g. of a precipitate with the melting point of 51° C. are obtained. The precipitate is dissolved in 120 ml. of formic acid, 3 g. of p-formaldehyde are added and the mixture heated for 2 hours under reflux. After extracting the solvent, there are obtained 18 g. of a material which is identical with that previously described.

Copolymerisation with trioxane.—2.5 g. of p-toluosulphonyl thiazolidine are dissolved in 25 g. of trioxane at 75° C. After adding 0.1 ml. of a 10% solution of $BF_3$ etherate in ether, the mixture first of all becomes cloudy and then it very quickly becomes jelly-like and solid. The reaction is completed after 2 minutes. The solid block is comminuted, washed with acetone and maintained under reflux for 10 hours while suspended in 5% sodium hydroxide solution. The weight of the polymer then decreases to 15 g.; this remainder is then stable and shows an hourly loss in weight of 2% with the thermostability measurement at 220° C. The intrinsic viscosity $\eta_i$, measured at 60 C. in p-chlorophenol, is 0.6.

Example 2

N-benzene-sulphonyl thiazolidine.—37.3 ml. of benzene sulphochloride are added to 36.5 g. of thiazolidine hydrochloride in 46.3 ml. of pyridine while cooling with ice. The mixture is left to stand for 5 hours, is then introduced into 1 litre of water and the precipitate is washed with water until the discharge is colourless. After being recrystallised from ethanol, the yield is 68 g. M.P.: 36–38° C. Calculated: C, 47.25%; H, 4.86%; S, 27.96%. Found: C, 47.17%; H, 4.94%; S, 27.66%.

Copolymerisation with trioxane.—0.05 ml. of a 10% solution of $BF_3$ etherate in ether are added to 25 g. of trioxane and 2.5 g. of benzene sulphonyl thiazolidine at 75° C. Polymerisation takes place in the course of 10 minutes. After being comminuted, washed with methylene chloride and treated for 10 hours with alkali, as in Example 1, there are obtained 8 g. of a stable polymer, which loses 2% of its weight hourly at 220° C., contains 0.22% of sulphur and has an intrinsic viscosity $\eta_i = 0.95$, meaured in p-chlorophenyl at 60° C.

Example 3

Methane sulphonyl thiazolidine.—77.2 ml. of methane sulphochloride and a potassium carbonate solution are added dropwise to a solution of 125 g. of thiazolidine hydrochloride in 500 ml. of water while stirring, in such a quantity that the pH value is maintained between 5 and 8. A precipitate is formed which is suction filtered, washed with water and recrystallised from ethanol. Yield: 135 g. M.P. 78–79° C.

Calculated: C, 28.78%; H, 5.42%; S, 38.34%. Found: C, 29.09%; H, 5.61%; S, 38.02%.

Copolymerisation with trioxane.—14 g. of methyl sulphonyl thiazolidine (1.5 mol. percent) and 250 mg. of 2-methyl-1,3-dioxolenium fluoroborate are added to an emulsion of 500 g. of trioxane in 500 ml. of heptamethylnonane at 70° C. The mixture immediately becomes cloudy and changes into a suspension; within 5 minutes, the temperature rises to 80° C. and during 20 minutes, it falls again to 70° C.; it is kept for another 3 hours at 70° C. 463 g. of solid polymer are isolated. There is a loss in weight of 40% on degradation in 5% aqueous sodium hydroxide solution. The product then obtained is thermally stable; it loses 0.8% of its weight hourly on thermostability measurement at 220° C. The intrinsic viscosity, measured at 60° C. in p-chlorophenol, is $\eta_i^{600°} = 1.071$.

We claim:

1. A process which comprises copolymerizing trioxane at a temperature of from about 50 to about 120° C. in the presence of a cationically active catalyst with 0.5 to 50 mol percent, based on trioxane, of a cyclic nitrogen compound of the formula:

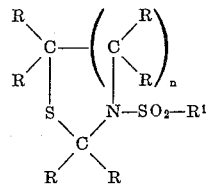

wherein R is hydrogen, lower alkyl or aryl, $R^1$ is alkyl, aryl, aralkyl or alkaryl and $n$ is an integer from 1 to 3.

2. The process of claim 1 wherein N-methane sulphonyl thiazolidine, N-benzene-sulphonyl thiazolidine or N-toluolsulphonyl thiazolidine is employed as cyclic nitrogen compound.

3. A copolymer produced by copolymerizing trioxane at a temperature of from about 50 to about 120° C. in the presence of a cationically active catalyst with 0.5 to 50 mol percent, based on trioxane, of a cyclic nitrogen compound of the formula:

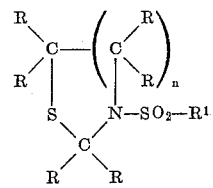

wherein R is hydrogen, lower alkyl or aryl, $R^1$ is alkyl, aryl, aralkyl or aralkyl and $n$ is an integer from 1 to 3.

4. The copolymer of claim 3 wherein 0.5 to 5 mol percent, based on trioxane, of said cyclic nitrogen compound is employed.

5. A copolymer of claim 3 wherein said cyclic nitrogen compound is N-methane sulphonyl thiazolidine, N-benpene sulphonyl thiazolidine or N-toluolsulphonyl thiazolidine.

6. The process of claim 1 wherein R is hydrogen, lower alkyl or phenyl and $R^1$ is alkyl having up to 6 carbon atoms, phenyl or tolyl.

7. The copolymer of claim 3 wherein R is hydrogen, lower alkyl or phenyl and $R^1$ is alkyl having up to 6 carbon atoms, phenyl or tolyl.

8. The process of claim 1 wherein a member selected from the group consisting of styrene, acrylonitrile, ethylvinyl ether, methylvinyl sulphone, ethylene oxide, propylene oxide, 1,3-dioxolane, diethylene glycol formal, triethylene glycol formal, a bis (alkyl sulphonyl)-imidazolidine and an alkylsulphonyl oxazolidine is employed as an additional comonomer.

9. The process of claim 1 wherein the cationically active catalyst is a Lewis acid selected from the group consisting of an addition compound of boron trihalide with diethyl ether, tetrahydrofuran acetonitrile, or 2-methyl-1,3-dioxolenium fluorborate.

No references cited.

WILLIAM H. SHORT, *Primary Examiner.*

E. M. WOODBERRY, *Assistant Examiner.*